United States Patent
Adamopoulos

(10) Patent No.: US 10,710,879 B2
(45) Date of Patent: Jul. 14, 2020

(54) PROCESS FOR MAXIMIZING HYDROGEN RECOVERY

(71) Applicant: UOP LLC, Des Plaines, IL (US)

(72) Inventor: Eleftherios Adamopoulos, Gurnee, IL (US)

(73) Assignee: UOP LLC, Des Plaines, IL (US)

( * ) Notice: Subject to any disclaimer, the term of this patent is extended or adjusted under 35 U.S.C. 154(b) by 138 days.

(21) Appl. No.: 15/796,709

(22) Filed: Oct. 27, 2017

(65) Prior Publication Data

US 2018/0111831 A1    Apr. 26, 2018

Related U.S. Application Data

(63) Continuation of application No. PCT/US2016/057934, filed on Oct. 20, 2016.
(Continued)

(51) Int. Cl.
*C01B 3/50* (2006.01)
*B01D 53/22* (2006.01)
(Continued)

(52) U.S. Cl.
CPC ............ *C01B 3/503* (2013.01); *B01D 53/02* (2013.01); *B01D 53/047* (2013.01);
(Continued)

(58) Field of Classification Search
CPC ...... B01D 53/02; B01D 53/047; B01D 53/22; B01D 53/228; B01D 53/229;
(Continued)

(56) References Cited

U.S. PATENT DOCUMENTS

| 4,863,492 A | 9/1989 | Doshi et al. |
| 5,332,492 A | 7/1994 | Maurer et al. |

(Continued)

FOREIGN PATENT DOCUMENTS

EP    2733115 A1    5/2014

OTHER PUBLICATIONS

Search Report dated Jan. 19, 2017 for corresponding PCT Appl. No. PCT/US2016/057934.
(Continued)

*Primary Examiner* — Jason M Greene

(57) ABSTRACT

The process can be used in any hydrocarbon process in which it is desirable to recover hydrogen. The process can include catalytically reforming a hydrocarbon feed, a paraffin dehydrogenation to produce light olefins or a synthesis gas generating process. There is an effluent stream having hydrogen and hydrocarbons that is first sent to an adsorption zone to produce a pure hydrogen stream and a tail gas stream. The tail gas stream is then sent across a feed side of a membrane having the feed side and a permeate side. The membrane that is selected is selective for hydrogen over one or more C1-C6 hydrocarbons and light ends including CO, $CO_2$, $N_2$ and $O_2$, and withdrawing from the permeate side a permeate stream enriched in hydrogen compared with a residue stream withdrawn from the feed side. The permeate stream is then recycled to be sent through the adsorption zone.

13 Claims, 1 Drawing Sheet

Related U.S. Application Data

(60) Provisional application No. 62/246,269, filed on Oct. 26, 2015.

(51) Int. Cl.
  *B01D 53/047* (2006.01)
  *B01D 53/02* (2006.01)
  *B01D 69/08* (2006.01)
  *B01D 71/16* (2006.01)
  *B01D 71/64* (2006.01)
  *B01D 71/68* (2006.01)

(52) U.S. Cl.
  CPC ......... *B01D 53/228* (2013.01); *B01D 53/229* (2013.01); *B01D 69/08* (2013.01); *B01D 71/16* (2013.01); *B01D 71/64* (2013.01); *B01D 71/68* (2013.01); *C01B 3/50* (2013.01); *C01B 3/508* (2013.01); *B01D 2256/16* (2013.01); *B01D 2257/102* (2013.01); *B01D 2257/104* (2013.01); *B01D 2257/502* (2013.01); *B01D 2257/504* (2013.01); *B01D 2257/702* (2013.01); *C01B 2203/0227* (2013.01); *C01B 2203/043* (2013.01); *C01B 2203/0405* (2013.01); *C01B 2203/1235* (2013.01); *C01B 2203/146* (2013.01); *Y02C 10/08* (2013.01); *Y02C 10/10* (2013.01); *Y02P 20/152* (2015.11)

(58) Field of Classification Search
  CPC ....... B01D 2256/16; C01B 3/50; C01B 3/501; C01B 3/503; C01B 3/508; C01B 2203/0405; C01B 2203/042; C01B 2203/043
  See application file for complete search history.

(56) References Cited

U.S. PATENT DOCUMENTS

| | | | | |
|---|---|---|---|---|
| 5,435,836 | A | * | 7/1995 | Anand ................. B01D 53/229 95/139 |
| 6,592,749 | B1 | * | 7/2003 | Lokhandwala ...... B01D 53/229 208/100 |
| 2010/0126180 | A1 | * | 5/2010 | Forsyth ................ B01D 53/229 60/780 |
| 2010/0129284 | A1 | * | 5/2010 | Niitsuma ............. B01D 53/047 423/437.1 |
| 2011/0085966 | A1 | * | 4/2011 | Vauk ...................... C01B 3/501 423/648.1 |
| 2015/0086472 | A1 | * | 3/2015 | Adamopoulos ......... C01B 3/508 423/651 |

OTHER PUBLICATIONS

Examination Report dated Sep. 5, 2019 for corresponding Indian Application No. 201817015877.

* cited by examiner

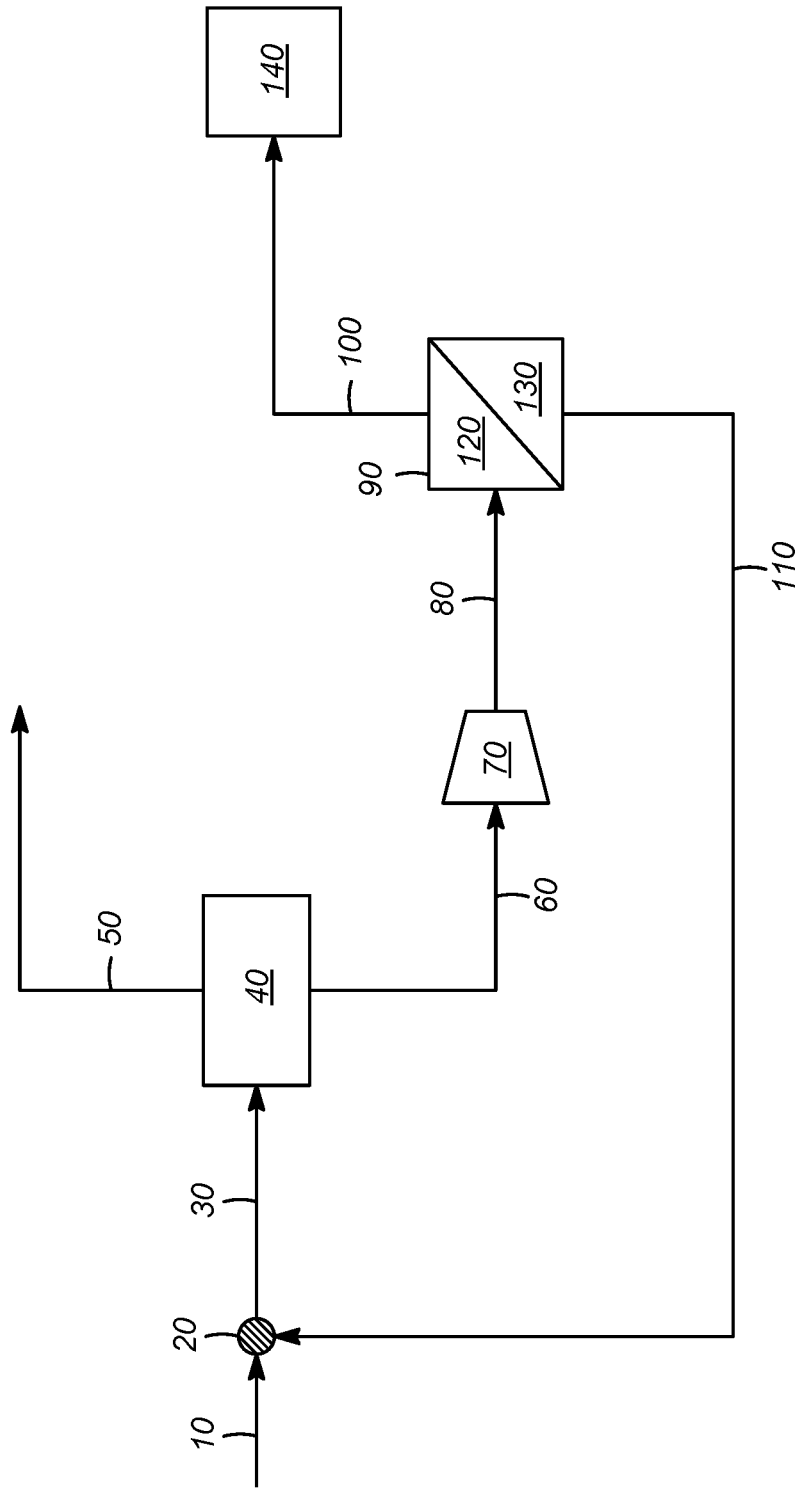

PROCESS FOR MAXIMIZING HYDROGEN RECOVERY

CROSS-REFERENCE TO RELATED APPLICATIONS

This application is a Continuation of copending International Application No. PCT/US2016/057934 filed Oct. 20, 2016 which application claims benefit of U.S. Provisional Application No. 62/246,269 filed Oct. 26, 2015, the contents of which cited applications are hereby incorporated by reference in their entirety.

FIELD OF THE INVENTION

This invention generally relates to a process for maximizing hydrogen recovery.

DESCRIPTION OF THE RELATED ART

Various types of catalytic hydrocarbon conversion reaction systems utilized in petroleum and petrochemical industries can convert hydrocarbons to different products. The reactions employed in such systems can be either exothermic or endothermic. Usually, the reactions result in either the net production of hydrogen or the net consumption of hydrogen. A hydrogen recovery system can be used for processes producing hydrogen. Generally, a net production of hydrogen occurs during catalytic reforming or through processes that convert saturated hydrocarbons to olefins or to aromatics and recovery of the hydrogen for use in chemical processing or fuel is typically desired. Another industrial process in which hydrogen is produced is a feed stream from a coke oven. A coke oven is a device used to produce coke from coal. In this process, large quantities of synthesis gas are produced and it is desirable to recover as much of the hydrogen as possible from this process and from other processes that involve the heating and/or gasification of hydrocarbons.

However, current hydrogen recovery systems suffer from several shortcomings. Many fail to remove sufficient amounts of heavier compounds, such as nitrogen, carbon oxides, including carbon monoxide, methane, ethane, and ethene, resulting in greater energy consumption by a compressor. Also, insufficient systems for separating hydrogen gas from contaminants can allow catalytic poisoning if the hydrogen gas is recycled to a reforming zone or used in other hydroprocessing catalytic processes. Additionally, if the recovered hydrogen has a sufficiently different composition and is combined with another hydrogen gas, such a combination may result in process upsets, such as impeding compressor efficiency. In addition, in some processes it is advantageous to the economics of the process to maximize the recovery of hydrogen to levels of 98% or better. In one possible process scheme maximizing hydrogen recovery results in build-up of methane (and ethane to a lesser degree) in a tail gas recycle loop that limits the amount of PSA tail gas that can be recycled, and that in turn limits hydrogen recovery. There is a need to remove this methane "bottleneck" and push the overall hydrogen recovery to 98% or better. In addition, in some embodiments of the invention the need for purified methane is achieved. Purified methane serves as the building block for a variety of chemicals produced in a petrochemical complex. It is advantageous to develop processes that not only recover hydrogen but also allow for recovery and use of valuable hydrocarbons including methane and ethane. Therefore, there is a desire to provide other separation and/or hydrogen recovery systems to overcome these deficiencies.

SUMMARY OF THE INVENTION

In the practice of the invention, an effluent from a reaction zone comprising a mixture of hydrocarbons and hydrogen is sent to an adsorption zone. A hydrogen product stream is produced and a tail gas from the adsorption zone is compressed and sent as a feed stream across a feed side of a membrane having a feed side and a permeate side, and being selective for hydrogen over one or more of C1-C6 hydrocarbons. The process further comprises withdrawing from the permeate side a permeate stream enriched in hydrogen compared with a residue stream withdrawn from the feed side that has a low concentration of hydrogen. The permeate stream is then recycled to be combined with the effluent that is sent to the adsorption zone. The residue stream may be sent to be used for fuel or it may be returned to a product recovery part of the process such as being sent to a de-ethanizer column to recover propane (feed) and propylene (product). Depending upon the process being employed, other products may be recovered. This process allows for an increase in the overall recovery of both the hydrogen and the hydrocarbon.

One exemplary embodiment can be a process for catalytic reforming. The process can include catalytically reforming a hydrocarbon feed in a reaction zone, obtaining an effluent stream having hydrogen and hydrocarbons from the reaction zone, obtaining from at least a portion of the effluent stream a waste hydrocarbon stream from an adsorption zone, passing at least a portion of the waste hydrocarbon stream as a feed stream across a feed side of a membrane having the feed side and a permeate side, and being selective for hydrogen over one or more C1-C6 hydrocarbons, and withdrawing from the permeate side a permeate stream enriched in hydrogen compared with a residue stream withdrawn from the feed side. The residue stream is then be returned to the adsorption zone for further processing.

Another exemplary embodiment may be a process for dehydrogenation of light paraffins, such as in UOP's Oleflex process. The process may involve reacting a hydrocarbon feed in a reaction zone, obtaining an effluent stream having hydrogen and hydrocarbons from the reaction zone, obtaining from at least a portion of the effluent stream a waste hydrocarbon stream from an adsorption zone, passing at least a portion of the waste hydrocarbon stream as a feed stream across a feed side of a membrane having the feed side and a permeate side, and being selective for hydrogen over nitrogen, carbon monoxide, and one or more C1-C6 hydrocarbons, and withdrawing from the permeate side a permeate stream enriched in hydrogen and having at least about 85%, by mole, hydrogen which then is returned to the adsorption zone. A non-permeate or residue stream may be recycled to a de-ethanizer to recover propane and propylene to improve the product yield of the process.

Definitions

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, carbon oxides, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. A "stream" may also be or include substances, e.g., fluids or substances behaving as fluids, other than hydrocarbons, such as air, hydrogen, or catalyst.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the terms "adsorbent" and "adsorber" include, respectively, an absorbent and an absorber, and relates, but is not limited to, adsorption, and/or absorption.

As used herein, the term "liquid hourly space velocity" can be defined as volumes of fresh charge stock per hour per volume of catalyst particles in the reaction zone and be abbreviated "LHSV".

As used herein, the term "hour" may be abbreviated "hr", the term "kilogram" may be abbreviated "kg", the term "kilopascal" may be abbreviated "KPa", and the terms "degrees Celsius" may be abbreviated "° C.". All pressures are absolute.

As depicted, process flow lines in the FIGURES can be referred to interchangeably as, e.g., lines, pipes, feeds, effluents, products, portions, remainders, discharges, or streams.

BRIEF DESCRIPTION OF THE DRAWING

The FIGURE is a schematic depiction of an exemplary hydrogen recovery process flow scheme.

DETAILED DESCRIPTION

Referring to the FIGURE, a feed 10 comprising a mixture of hydrocarbon and hydrogen 10 can be from a reforming process, a paraffin dehydrogenation process or a synthesis gas producing process. Feed 10 may then proceed to a mix point 20 and continue as PSA feed 30 to a PSA unit 40 to produce a hydrogen product stream 50 that may comprise over 99% hydrogen and a tail gas 60 that still has an appreciable content of hydrogen such as about 35% hydrogen. Tail gas 60 is compressed in compressor 70 to produce compressed tail gas stream 80. Then tail gas stream 80 is sent through membrane unit 90 which produces a non-permeate stream 100 that contains a small amount of hydrogen that can be further processed to recover hydrocarbons or used as fuel and permeate 110 from membrane unit 90 is recycled to mix point 20.

PSA unit (also referred to as PSA zone, herein) 40 is a pressure swing adsorption (which may be abbreviated "PSA") zone which produces hydrogen product stream 50 with a purity of about 90.0-about 99.9999%, by mole, hydrogen, or preferably of about 95.0-about 99.99%, by volume, hydrogen. The hydrogen product stream 50 may recover about 80-about 95%, by mole, or even about 85-about 90%, by mole, of the hydrogen feed stream 30. Additionally, tail gas stream 60 that is produced by the PSA unit 40 during a desorption or purge step at a desorption pressure ranging from about 30-about 550 KPa.

The PSA zone 40 can include a plurality of adsorption beds containing an adsorbent selective for the separation of hydrogen from the hydrocarbons. Often, each adsorption bed within the adsorption zone undergoes, on a cyclic basis, high pressure adsorption, optional cocurrent depressurization to intermediate pressure levels with the release of product from void spaces, countercurrent depressurization to lower desorption pressure with the release of desorbed gas from the feed end of the adsorption bed, with or without purge of the bed, and repressurization to higher adsorption pressure. This process may also include an addition to this basic cycle sequence, such as a cocurrent displacement step, or co-purge step in the adsorption zone following the adsorption step in which the less readily adsorbable component, or hydrogen, is essentially completely removed therefrom by displacement with an external displacement gas introduced at the feed end of the adsorption bed. The adsorption zone may then be countercurrently depressurized to a desorption pressure that is at or above atmospheric pressure with the more adsorbable component being discharged from the feed end thereof.

In a multibed adsorption system, the displacement gas used for each bed may be obtained by using at least a portion of the debutanizer overhead vapor stream, although other suitable displacement gas, such as an external stream including one or more C1-C4 hydrocarbons, may also be employed. Usually, the high pressure adsorption includes introducing the feedstream or hydrogen-rich gas stream to the feed end of the adsorption bed at a high adsorption pressure. The hydrogen passes through the bed and is discharged from the product end thereof. An adsorption front or fronts are established in the bed with the fronts likewise moving through the bed from the feed end toward the product end thereof. Preferably, the PSA zone 40 can include pressures of about 300-about 6,890 KPa.

The PSA zone 40 can be carried out using any adsorbent material selective for the separation of hydrogen from hydrocarbons in the adsorbent beds. Suitable adsorbents can include one or more crystalline molecular sieves, activated carbons, activated clays, silica gels, activated aluminas, and combinations thereof. Preferably, the adsorbents are one or more of an activated carbon, an alumina, an activated alumina, and a silica gel. An exemplary PSA zone is disclosed in, e.g., U.S. Pat. No. 5,332,492.

The PSA zone 40 can provide the hydrogen product stream 50 that can be provided to a reaction zone that requires hydrogen, and the tail gas stream 60. The membrane unit 90 forms a feed side 120 and a permeate side 130. The membrane unit 90 may be a hollow fiber membrane, a spiral wound membrane or other suitable type of membrane. The hollow fiber membrane can be made of at least one of a polyimide, cellulose acetate, cellulose triacetate, and polysulfone. Typically, the polyimide may be formed by reacting a dianhydride and a diamine or a dianhydride and a diisocyanate. Such membranes are disclosed in, e.g., U.S. Pat. No. 4,863,492.

A residue or non-permeate stream 100 can be withdrawn from the feed side 120 of the membrane 90. The residue stream 100 may include nitrogen; one or more carbon oxides, typically carbon monoxide although carbon dioxide may be present instead or additionally; and one or more C1-C6 hydrocarbons. Often, the residue stream 100 is enriched in nitrogen, the one or more carbon oxides, typically carbon monoxide, and the one more C1-C6 hydrocarbons compared with the tail gas stream 60. The residue stream 100 can be provided to a fuel header, provided as a feed to another process such as a steam-methane reforming unit, or optionally recontacted in a vessel to recover liquefied petroleum gases prior to being sent to the fuel header.

Generally, the compressed tail gas stream 80 contacts the membrane 90 with the smaller hydrogen molecules passing through the membrane 90 and other molecules, such as C1-C6 hydrocarbons, nitrogen, carbon dioxide, and carbon monoxide, are blocked. Particularly, the membrane 90 can block nitrogen and carbon oxides, such as carbon monoxide.

The membrane 90 can be operated in such a way that the permeate stream 110 can include no more than about 8 mol %, or about 20 ppm, by mole, of nitrogen and no more than about 0.3 mol %, or about 40 ppm, by mole, of carbon monoxide. Generally, the amount of hydrogen by mole percent in the permeate stream 110 is substantially the same as the feed stream 10 and typically the amount of hydrogen composed in the permeate stream 110 is within about ±15%, about ±5%, about ±2%, or about ±1%, by mole, of the feed stream 10. Additionally, the permeate stream 110 can include at least about 60%, or even at least about 95% or about 97%, by mole, hydrogen. The permeate stream 110 may recover at least about 90%, by mole, of the hydrogen in the compressed tail gas stream 80. Meanwhile, the membrane 90 rejects at least about 70%, by mole, carbon monoxide; about 76%, by mole, nitrogen; about 79%, by mole, methane; about 91%, by mole, ethane; and almost 100%, by mole, of the one or more C3+ hydrocarbons in the vapor stream 30. The non-permeate or residue stream 100 may be sent to a product recovery zone 140. The process and system of the invention can achieve an overall hydrogen recovery of at least about 98%, by mole, of the hydrogen present in the feed stream 10.

Example

The following example demonstrates the specifics and benefits of this invention:

Net Gas Conditions

| Flow Rate, lb-mol/hr | 8102.13 |
| Temperature, ° F. | 97 |
| Pressure, psig | 50 |
| Composition, mol % | |
| Hydrogen | 93.03 |
| Carbon Monoxide | 0.08 |
| Methane | 6.44 |
| Ethylene | 0.03 |
| Ethane | 0.30 |
| Propene | 0.06 |
| Propane | 0.06 |

PSA Product Specifications

| Pressure, psig | 340 |
| Composition | |
| Hydrogen | 99.999 mol % |
| Carbon Monoxide | <1 ppmv |
| Methane | <10 ppmv |

Tail Gas Specifications

| PSA tail gas pressure | 5 psig |
| Fuel header pressure | 85 psig |

Process Schemes: The following process schemes were evaluated:

Scheme #1: Once-through PSA with the tail gas being compressed to fuel header pressure. The PSA feed pressure is set at 350 psig. The hydrogen recovery is 90%.

Scheme #2: PSA with approximately 72% tail gas recycle. The compressed, recycled tail gas gets mixed with the raw net gas upstream of the net gas compressor. The overall hydrogen recovery is 97%.

Scheme #3: The PSA tail gas is compressed to 204 psig (instead of 85 psig) and is fed to a membrane unit. The membrane permeate gas is recycled and mixed with the raw net gas upstream of the net gas compressor. The overall hydrogen recovery is 99%.

Scheme #4: The PSA tail gas is compressed to 467 psig (instead of 85 psig) and is fed to a membrane unit. The membrane permeate gas is recycled and mixed with the raw net gas upstream of the net gas compressor. The overall hydrogen recovery is 99%.

Results: The table below summarizes the four process schemes described above.

| Scheme # | 1 | 2 | 3 | 4 |
|---|---|---|---|---|
| Net gas Compressed to 356 psig (hp) | 7,861 | 9,847 | 9,147 | 9,052 |
| Tail Gas Compressed to 85 psig (hp) | 1,237 | 2,626 | — | — |
| Tail Gas Compressed to 204 psig (hp) | — | — | 2,141 | — |
| Tail Gas Compressed to 467 psig (hp) | — | — | — | 2,653 |
| Total Compressed (hp) | 9,098 | 12,473 | 11,288 | 11,705 |
| Overall H2 Rec (%) | 90 | 97 | 99 | 99 |
| # Membrane Modules | — | — | 12 | 4 |

With a once-through PSA operating at 350 psig (Scheme #1), the maximum hydrogen recovery is 90%. A tail gas compressor is required to boost the tail gas pressure to fuel header pressure (85 psig). The total power consumption over the netgas and tail gas compressors is approximately 9,098 hp.

By employing the tail gas recycle concept (Scheme #2), the overall hydrogen recovery can be increased to 96%-97%, max. In doing so, the total power consumption increases to approximately 12,473 hp (or plus 37% compared to Scheme #1).

The overall hydrogen recovery and total power consumption of Scheme #2 are dictated by the tail gas impurities that build up in the recycle loop. Compressing the PSA tail gas to at least 204 psig and passing it through a membrane unit (Scheme #3) eliminates this impurity "bottleneck" since the bulk of the impurities get rejected in the membrane's non-permeate (residue) stream. The membrane's permeate stream can be recycled in its entirety and mixed with the raw Oleflex netgas upstream of the netgas compressor. As a result, the overall hydrogen recovery can improve to 99%+ while the total power consumption increases to about 11,288 hp (or plus 24% compared to Scheme #1). Looking at the netgas compressor alone, the increase in power consumption compared to Scheme #1 is approximately 16%.

Scheme #4 shows that by compressing the PSA tail gas to 467 psig instead of 204 psig cuts the number of membrane modules (housings) by more than half while the total power consumption increases by less than 4%. In this process, a membrane non-permeate or residue stream may be recycled to a product recovery section, such as a de-ethanizer for recovery of propane and propylene.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by volume, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for recovery of hydrogen, comprising:
    A) obtaining a stream comprising hydrogen, hydrocarbons, carbon monoxide, carbon dioxide, oxygen and nitrogen from a reaction zone;
    B) sending said stream through an adsorption zone to produce a hydrogen stream and a tail gas stream;
    C) compressing the tail gas stream to at least 467 psig and passing at least a portion of the compressed tail gas stream across a feed side of a membrane having the feed side and a permeate side, and being selective for hydrogen over one or more C1-C6 hydrocarbons, carbon monoxide, carbon dioxide, oxygen and nitrogen, wherein the membrane rejects at least about 79% by mole methane of said stream obtained from the reaction zone;
    D) withdrawing from the permeate side a permeate stream enriched in hydrogen compared with a residue stream withdrawn from the feed side, wherein said residue stream is sent to a product recovery section of an upstream process for additional recovery of feed and product; and
    E) recycling said permeate stream into said stream from said reaction zone.

2. The process according to claim 1, wherein the permeate stream comprises no more than about 8 percent, by mole, of nitrogen and no more than about 0.3 percent, by mole, of carbon monoxide.

3. The process according to claim 1, wherein the permeate stream comprises no more than about 100 ppm, by mole, of nitrogen and no more than about 100 ppm, by mole, of carbon monoxide.

4. The process according to claim 1, wherein the permeate stream comprises no more than about 20 ppm, by mole, of nitrogen and no more than about 40 ppm, by mole, of carbon monoxide.

5. The process according to claim 1, wherein an amount of hydrogen by mole percent in the permeate stream is substantially the same as said stream from said reaction zone.

6. The process according to claim 5, wherein the amount of hydrogen composition in the permeate stream is within about 15%, by mole, of the said stream from said reaction zone.

7. The process according to claim 5, wherein the amount of hydrogen composition in the permeate stream is within about 2%, by mole, of the said stream from said reaction zone.

8. The process according to claim 5, wherein the amount of hydrogen composition in the permeate stream is within about 1%, by mole, of the said stream from said reaction zone.

9. The process according to claim 1, wherein the membrane comprises a hollow fiber membrane.

10. The process according to claim 1, wherein the membrane comprises a spiral wound membrane.

11. The process according to claim 1, wherein the permeate comprises from about 60 to 97%, by mole, hydrogen.

12. The process according to claim 1, wherein the permeate comprises at least about 98%, by mole, hydrogen.

13. The process according to claim 9, wherein the hollow fiber membrane comprises at least one polymer selected from the group consisting of polyimide, cellulose acetate, cellulose triacetate, and polysulfone.

* * * * *